United States Patent [19]

Neumaier et al.

[11] Patent Number: 4,732,218

[45] Date of Patent: Mar. 22, 1988

[54] HAMMER DRILL WITH SEPARATE AND INTERCONNECTABLE DRIVE MEANS

[75] Inventors: Anton Neumaier, Fürstenfeldbruck; Hans-Jürgen Hoereth, Munich, both of Fed. Rep. of Germany

[73] Assignee: Hilti Aktiengesellschaft

[21] Appl. No.: 859,647

[22] Filed: May 5, 1986

[30] Foreign Application Priority Data

May 8, 1985 [DE] Fed. Rep. of Germany ....... 3516494

[51] Int. Cl.⁴ ............................................. B23B 45/16
[52] U.S. Cl. .................................... 173/105; 173/104; 173/47; 74/665 A; 74/665 L; 60/716
[58] Field of Search ........................ 173/48, 50, 51, 12, 173/105, 109; 74/661, 665 A, 665 L, 678; 60/716, 717

[56] References Cited

U.S. PATENT DOCUMENTS

| | | | |
|---|---|---|---|
| 2,154,591 | 4/1939 | Waseige | 60/717 |
| 2,792,723 | 5/1957 | Von Zelewsky | |
| 4,192,391 | 3/1980 | Hastrent et al. | 173/116 |
| 4,462,467 | 7/1984 | Weingartner | |
| 4,481,841 | 11/1984 | Abthoff et al. | 60/716 |
| 4,568,289 | 2/1986 | Heidrich et al. | 74/665 A |
| 4,579,019 | 4/1986 | Gabriele | 74/675 |

FOREIGN PATENT DOCUMENTS 0021881 7/1981 Fed. Rep. of Germany .
7224468 2/1973 France .

Primary Examiner—Frank T. Yost
Assistant Examiner—Willmon Fridie, Jr.
Attorney, Agent, or Firm—Toren, McGeady & Associates

[57] ABSTRACT

A hammer drill includes a unit for supplying impact force to a tool inserted into the hammer drill and a unit for supplying rotational forces to the tool. A first drive motor drives the impact force unit and a second drive motor drives the rotational force unit. The motors can be operated independently of one another. A first drive train interconnects the first drive motor to the impact force unit and a second drive train interconnects the second drive motor and the rotational force unit. A coupling device interconnects the first and second drive trains so that at least one of the impact force unit the rotational force unit can be selectively driven by both the first and second motors.

5 Claims, 2 Drawing Figures

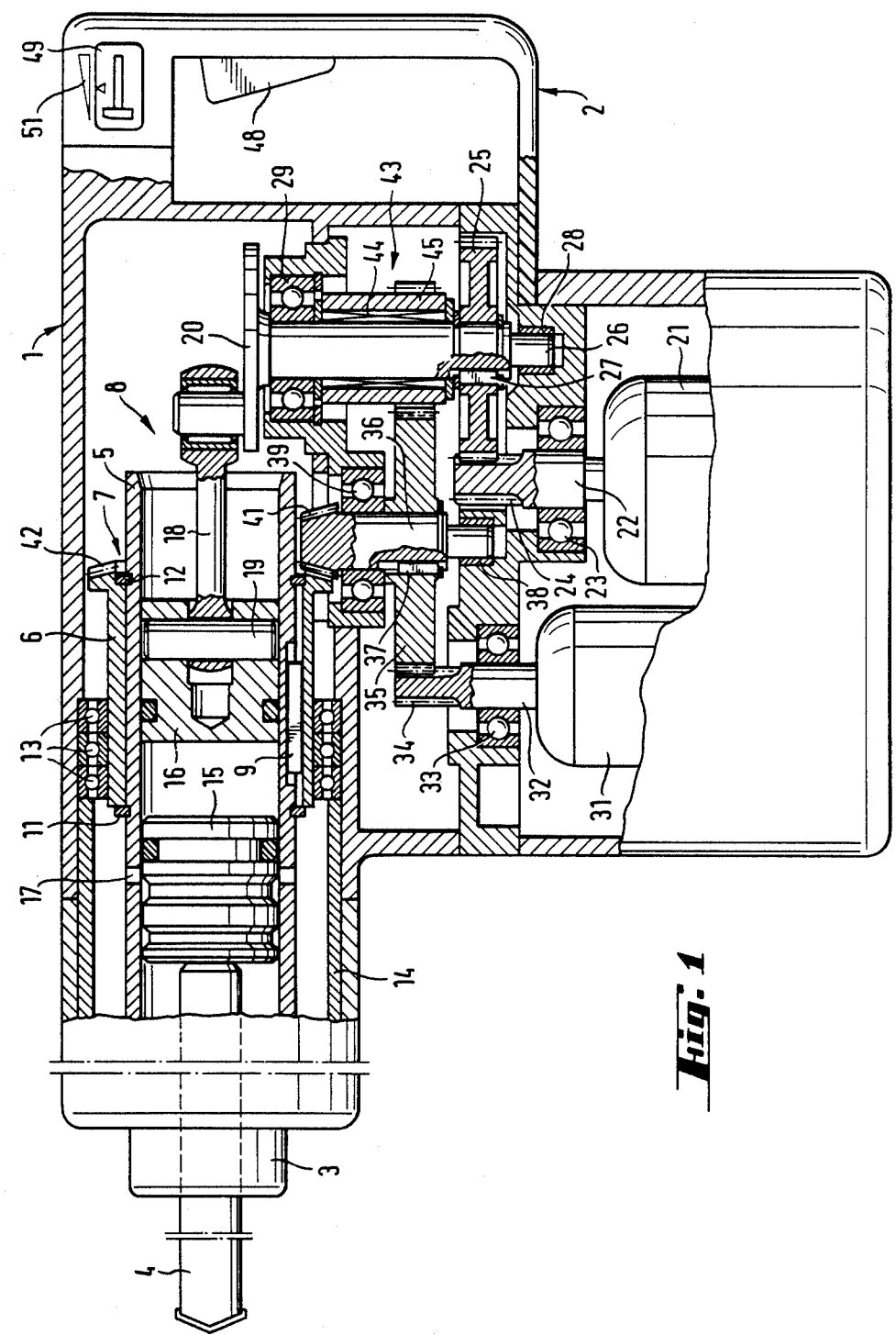

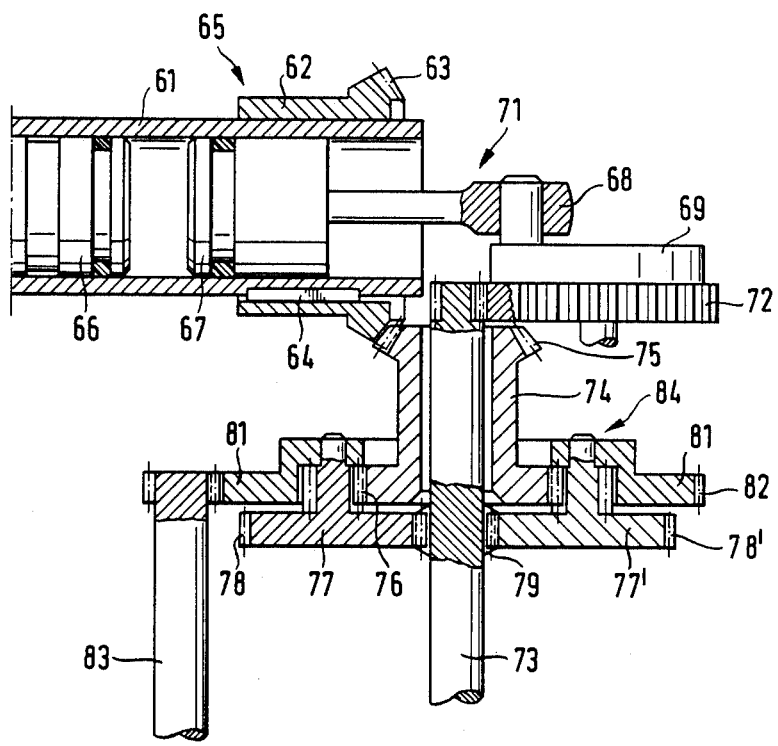

HAMMER DRILL WITH SEPARATE AND INTERCONNECTABLE DRIVE MEANS

BACKGROUND OF THE INVENTION

The present invention is directed to a hammer drill in which a tool can be selectively imparted rotational force, impact force or a combination of rotational and impact forces by an impact force unit and a drive force unit with a drive motor for each of the units with the drive motors being independently controllable.

To achieve effective performance and long service life for a hammer drill of the type mentioned above, it is necessary to provide individual controllability of the revolutions per minute, the number of impact strokes and the strength of such strokes. Such a requirement occurs because of the different dimensions of the tools used as well as the type of material in which the hammer drill is employed.

In a known hammer drill, note the German Offenlegungsschrift No. 31 42 740, two drive motors are used each controllable independently of the other so that one drive motor operates the impact force unit and a second one operates the rotational force unit.

To assure that the hammer drill can provide the necessary performance in each type of operation, each drive motor is designed for the maximum performance for its respective type of operation and, as a result, relatively large drive motors are needed.

SUMMARY OF THE INVENTION

Therefore, the primary object of the present invention is to provide a hammer drill with a first and a second drive motor for providing the driving force for an impact force unit and a rotational force unit so that the force units can be controlled independently of one another while the drive motors are distinguished by being of a relatively small size.

In accordance with the present invention, the drive train for the first drive motor operating the impact force unit and the drive train for the second drive motor operating the rotational force unit includes a coupling or clutch device so that the driving force from one drive train can be supplied to the other.

Appropriately, the coupling device is part of a gear box or transmission which mechanically connects the drive trains of the drive motors with one another. Accordingly, the first and second drive motors can assist one another by supplying driving force to the other drive train. As an example, the first drive motor operating the impact force unit can supply additional force to the rotational drive unit if it is required. By operating the first and second motors at different rpms, the rpm, the impact force and strength can be controlled so that the drive motors can be relatively small and of different dimensions so that they can provide the driving force when they are coupled together.

It is advantageous if the coupling device is in the form of a planetary gear train. Preferably, the planetary gear train has two planetary gear wheels which mesh with the drive shaft of the first motor and also with a rim gear wheel rotatable concentrically about the drive shaft. The planetary gear wheels have their axes supported in a carrier rotatably supported on the drive shaft of the first motor so that the planetary gear wheels are rotatable about their own axes. The driving power of the first drive motor, the second drive motor or the combination of the two drive motors acts selectively upon the planetary gear wheels. In the combined or coupled operational mode, the drive motors operate the impact force unit and the rotational force unit via the planetary gear train so that due to the coupling connection between the drive trains from both drive motors, the driving force can be combined due to the coupling connection afforded by the planetary gear train. The second drive motor intended primarily for driving the rotational force unit can be sized considerably smaller than the first drive unit, that is, it can have approximately 30% of the power output of the first drive motor.

Preferably, the coupling device is a freewheeling clutch. It can be a clutch of conventional construction. Such a freewheeling clutch is formed of two clutch halves, one a driving half and the other a driven half and between the halves coupling links are provided. The freewheeling clutch is actuated by the relative direction of rotation of the coupling halves, in other words, in one rotational direction the clutch is engaged and in the other it is in freewheeling operation. Grip rollers are suitable as the coupling links. A coupling device in the form of a freewheeling clutch is distinguished particularly by the simplicity of the construction of the clutch and of its installation between the drive trains.

According to another feature of the invention, the freewheeling clutch is located on a drive shaft of the drive train leading from the first drive motor. The first drive motor which powers the impact force unit is relatively uniformly loaded by the impact force unit, while the second drive motor for powering the rotational force unit is subjected to constantly changing power requirements during the drilling operation. Such changing power requirements of the rotational drive unit is due to the changing frictional conditions affecting the tool in the borehole during the drilling operation and from the different characteristic of the material in which the drilling operation takes place.

In another feature of the present invention, the freewheeling clutch includes a clutch gear wheel meshed with an intermediate gear in the drive train between the second drive motor and the rotational force unit. The power flow which can be afforded is such that the drive shaft of the first drive motor can be overtaken by the clutch gear wheel so that the rpm of the tool is increased by the aid of the second drive motor over and above the rmp attainable with the first drive motor. In case there is a reduction in the rpm of the second drive motor due to the possible increased torque requirements for the rotation of the tool, the first drive motor automatically switches itself through the freewheeling clutch for assisting the drive of the rotational force unit.

The freewheeling rotational direction of the clutch gear wheel appropriately occurs opposite to the rotational direction in which the intermediate gear wheel is driven. In such an arrangement, the second drive motor effecting the drive of the tool always operates in the rotational direction ideal for the drilling tool. This applies both if the tool is operated only in rotation as well as for both rotation and impact. In operation where only impact force is supplied to the tool, it is effected by reversing the roational direction of the first drive motor as compared to its rotational direction for the operational modes mentioned above. Accordingly, the freewheeling clutch adopts a freewheeling position. When only rotational forces are directed to the tool, for instance, when drilling in wood, conditions may be encountered where a particularly high torque and a higher tool rpm is required than when the hammer drill is used for working on concrete. Under such circumstances, it is appropriate to provide a disconnect for the impact force unit in the drive train leading to such unit. If the impact mechanism is disconnected, it is possible to drive the first drive motor at its maximum rpm. Both drive motors then act together on the rotational force unit.

Where only a small amount of torque is required for the tool, there is the possibility to use only the second drive motor as the drive and to turn off the first drive motor.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side elevation, partly in section, of a hammer drill with a coupling device in the form of a free running clutch and embodying the present invention; and FIG. 2 is a view mostly in section of the essential parts for driving another embodiment of the hammer drill in a simplified arrangement, with a coupling device in the form of a planetary gear train.

DETAILED DESCRIPTION OF THE INVENTION

In FIG. 1 a hammer drill is illustrated including a housing 1 and a handle 2, note that the handle is shown on the right-hand side. The hammer drill is capable of directing one of rotational force, impact force, or the combination of rotational and impact forces to a tool 4 secured in a tool holder 3 located at the opposite end of the housing 1 from the handle 2.

Rotation is transmitted to the tool 4 by the jaws in the tool holder which are known and, therefore, are not shown in detail. The tool holder 3 is connected with a guide cylinder 5 which can be rotated. A sleeve-like member 6 with a bevel gear at its rear end is secured around the guide cylinder and the combination forms a rotational force unit 7 including the guide cylinder 5 and the tool holder 3. For supplying impact force, that is, axially driving force to the tool, at its rear or trailing end, the tool 4 extends into the guide cylinder 5 and into the effective impact range of an impact force unit 8.

The connection of the sleeve-like gear member 6 with the guide cylinder 5 is effected by a key 9 protruding into a longitudinal groove formed in each of the members so that the two members can rotate together as a unit. Lock rings 11, 12 secure the sleeve-like gear member so that it is not axially displaceable relative to the guide cylinder 5. The sleeve-like gear member 6 and the guide cylinder 5 are rotatably supported by a plurality of ball bearings 13 mounted within the housing 1. A bushing 14 extends from the front end of the housing to the forward ball bearing 13 and prevents any axial movement of the ball bearings toward the front end of the housing. The impact force unit 8 includes an impact piston and a driving piston axially displaceably supported within the guide cylinder in a sealing manner. The pistons are located in spaced relation within the guide cylinder 5 and the space between them is filled with air so that the reciprocating motion of the driving piston effects an alternating compression and expansion of the air due to the mass inertia of the impact piston 15. The reciprocating action of the driving piston 16 is transmitted through the air space between the pistons to the impact piston and the forward stroke of the impact piston acts against the trailing end of the tool 4. As can be seen in FIG. 1, openings 17 are formed in the forward end of the guide cylinder in the axially extending region of the impact piston 15 so that the piston is prevented from reciprocating if it moves forwardly through the guide cylinder 5 when a tool is no longer held within the tool holder. The reciprocating action of the drive piston 16 is effected by a connecting rod 18 secured at one end by a transverse bolt 19 to the drive piston and at its other end it is secured to a crank 20.

In the lower portion of FIG. 1 a first drive motor 21 is shown schematically and is connected to the impact force unit 8. Drive motor 21 has a rotor shaft 22 mounted in a ball bearing 23 in the housing and the shaft has a plurality of teeth 24 formed on its upper end. A drive train extends between the drive motor 21 and the impact force unit 8 and includes a drive wheel 25 in meshed engagement with the teeth 24 and the gear wheel 25 is secured on a drive shaft 26 so that the wheel and shaft rotate as a unit which is connected rigidly to the crank 20 for driving the impact force unit. A key 27 fixes the gear wheel 25 on the drive shaft 26 so that the two parts rotate as a unit. The drive shaft 26 is rotatably supported within the housing by a slide bearing 28 at its lower end and a ball bearing 29 at its upper end.

A second drive motor 31 shown schematically in FIG. 1 provides the driving force for the rotational force unit 7. The shaft 32 of the second drive motor 31 is supported in a ball bearing 33 within the housing and the shaft has a plurality of teeth 34 at its free end. A second drive train is located between the second drive motor 31 and the rotational force unit 7 with an intermediate gear wheel 35 in meshed engagement with the teeth 34 on the rotor shaft 32. Intermediate gear 35 is mounted on a shaft 36 so that the gear and shaft rotate as a unit. A key 37 interconnects the gear 35 with the shaft 36.

Shaft 36 is rotatably supported by a slide bearing 38 and by a roller bearing 39 both located within the housing 1. Bevel gear teeth 41 are located at the upper end of the shaft 36 in meshed engagement with the bevelled gear 42 on the sleeve-like gear member 6.

A freewheeling clutch 43 is located on the drive shaft 26. The clutch is formed by schematically shown clutch members 44 of conventional construction and these clutch members entrain a clutch gear wheel 45 in only one rotational direction of the drive shaft 26. Clutch gear wheel 45 is also in meshed engagement with the intermediate gear wheel 35. An off-on switch 48 is located in the handle 2 for operating the device. In addition, control switches, independent from one another, control the rpm of the first and second drive motors 21, 31 and are located in the handle, only the control switch 49 for the drive motor 21 is shown in FIG. 1. The appropriate rpm for the first and second drive motors 21, 31, can be established by operating the control switch relative to a stationary symbol 51.

To drive the tool 4 in rotation only, the second drive motor 31 is placed in operation at an appropriate rpm. The rotational force is transmitted by the rotor shaft 32 over the intermediate gear wheel 35 and the shaft 36 to the rotational force unit 7. At the same time, the intermediate gear wheel 35 rotates the clutch gear wheel in an idling manner. To provide both rotational and impact force to the tool 4, the first and second drive motors 21, 31 are actuated. The driving force is such that the drive shaft 26 is driven by the clutch gear wheel 45. Accordingly, the rpm of the tool can be increased by the second drive motor 31 in addition to the rpm provided by the first drive motor 21. Moreover, there is the possibility, if there is a reduction in the rpm of the second drive motor 31, due to increased torque, that the first drive motor 21, through the freewheeling clutch 43, assists the driving of the rotational force unit 7.

To transmit impact force exclusively to the tool 4, only the first drive motor 21 is placed in operation in the reverse direction as compared to the other operating mode, so that the freewheeling clutch 43 uncouples the drive shaft from the second drive train of the rotational force unit 7. The impact force can be adjusted by the appropriate selection of the rpm of the first driving motor with the aid of the control switch 49.

In FIG. 2 another embodiment is illustrated including a guide cylinder 61 encircled by a sleeve-like gear member 62 including a bevel gear 63 at one end. The sleeve-like member 62 is secured to the guide cylinder 61 by a key 64 so that they rotate as a unit. Guide cylinder 61 and the sleeve-like gear member 62 are parts of a rotational force unit 65. Impact piston 66 and drive piston 67 are slidably displaceably supported within the guide cylinder 61 similar to the embodiment shown in FIG. 1. A connecting rod 68 driven by a crank 69 is connected to the drive piston 67. The combination of the impact piston 66, the drive piston 67, connecting rod 68 and the crank 69 form an impact unit 71.

Crank 69 is mounted on a gear wheel 72 so that it can be driven. Gear wheel 72 is in meshed engagement with a gear train including gears on a rotor shaft 73 of a first drive motor, not shown. Mounted concentrically about the rotor shaft 73 is a pinion 74 which is freely rotatably relative to the rotor shaft. Pinion 74 is in engagement with the bevel gear 63 on the sleeve-like gear member 62 by a corresponding bevel gear 75. Axially spaced on the pinion 74 from the bevel gear 75 is the gear teeth 76 which mesh with two planetary gears 77, 77' located on diametrically opposite sides of the rotor shaft 73. Axially spaced on the planetary gears 77, 77' from the teeth engaging the teeth 76 on the pinion 74 are the larger gear wheel teeth 78, 78' in meshed engagement with teeth 79 formed on the rotor shaft 73. The planetary gears 77, 77' are rotatably supported on a common gear wheel 81. Gear wheel 81 is rotatably supported around the axis of the rotor shaft 73. The gear wheel 81 has a set of external teeth 82 in engagement with a rotor shaft 83 of a second drive motor, not shown.

In combination, planetary gears 77, 77' along with pinion 74 and the support gear wheel 81 form an epicyclic gear 74 which serves as a coupling device between the drive trains for the rotational force unit 65 and the impact force unit 71. By operating the drive motors for the two force units at different rpms, the rpm and the impact force supplied to the tool can be controlled.

Impact force unit 71 is driven by the rotor shaft 73. By a slight change in the rpm of the rotor shaft 73, the impact output can be changed by a multiple. At the same time, the rotation of the motor shaft 73 actuates the rotational force unit 65 via the planetary gears 77, 77' and the pinion 74. By means of the second drive motor, the support gear wheel 81 and the pinion 74 are driven by the rotor shaft 83. The rotational force supplied by the two drive motors to the pinion 74 are either added or subtracted from one another, depending on the rotational direction of the rotor shafts 73, 83. According, any required rpm between two limiting values can be provided for the tool.

While specific embodiments of the invention have been shown and described in detail to illustrate the application of the inventive principles, it will understood that the invention may be embodied otherwise without departing from such principles.

We claim:

1. Hammer drill for selectively providing rotational force, impact force or rotational and impact forces to a tool inserted into a hammer drill, comprising a housing, means within said housing for applying impact forces to the tool, means within said housing for applying rotational forces to the tool, a first drive motor arranged to drive said impact force means, a second drive motor arranged to drive said rotational force means, said first and second drive motors being controllable independently of one another, wherein the improvement comprises a first drive train interconnecting said first drive motor and said impact force means, a second drive train separate from said first drive train and interconnecting said second drive motor and said rotational force a coupling device, and means for interconnecting said first and second drive trains so that at least one of said impact force means and said rotational force means can be selectively driven by both said first and second drive motors.

2. Hammer drill as set forth in claim 1, wherein said coupling device comprises a planetary gear train.

3. Hammer drill, as set forth in claim 1, wherein said coupling device comprises a freewheeling clutch.

4. Hammer drill, as set forth in claim 3, wherein said first drive train includes a drive shaft, and said freewheeling clutch is mounted on said drive shaft.

5. Hammer drill, as set forth in claim 4, wherein said freewheeling clutch includes a clutch gear wheel, an intermediate gear wheel in meshed engagement with said clutch gear wheel, and said intermediate gear wheel located in said second drive train between said second drive motor and said rotational force unit.

* * * * *